June 12, 1962 J. D. PERDUE 3,039,101

PROCESS FOR PLOTTING DIGITAL DATA

Filed May 29, 1959 2 Sheets-Sheet 1

INVENTOR.
James D. Perdue
BY
S. J. Rotondi, A. J. Dupont & F. E. McGee

June 12, 1962 J. D. PERDUE 3,039,101

PROCESS FOR PLOTTING DIGITAL DATA

Filed May 29, 1959 2 Sheets-Sheet 2

INVENTOR.
James D. Perdue

BY

S. J. Rotondi, A. J. Dupont & F. E. McGee

United States Patent Office 3,039,101
Patented June 12, 1962

3,039,101

PROCESS FOR PLOTTING DIGITAL DATA

James D. Perdue, Dona Ana County, N. Mex. (Rte. 1, Box 27D, Las Cruces, N. Mex.)

Filed May 29, 1959, Ser. No. 817,010
11 Claims. (Cl. 346—1)
(Granted under Title 35, U.S. Code (1952), sec. 266)

The invention described herein may be manufactured and used by or for the Government for governmental purposes without payment to me of any royalty thereon.

This invention relates to plotting digital data and more particularly to an improved process for displaying digital data in a graphical format wherein is shown a main graph, a vernier plot and a self contained grid matrix, the combination of which may represent an almost unlimited variety of data such as temperature, speed, pressure and the like.

An object of the invention is a format whereon is presented digital data having digital accuracy and analog readability.

Another object of the invention is an improved graphical format consisting of a main graph, vernier plot, and a self contained calibration grid or matrix.

Another object of the invention is to present digital data covering a wide range of values on a comparatively narrow chart and with comparatively simple recording means.

Another object of the invention is a format having data thereon that is readable for both analog and digital purposes.

The art of plotting digital data is undergoing rapid evolution. This is because of increasing emphasis on digitization early in the data handling process. The plotting of digital telemetry data presents several problems. Some of the major problems are attainment of high resolution and accuracy, analog readability of the plot, reasonable cost of the plotter, and high maximum speed of operation.

The requirements of easy numerical readability with full digital resolution and accuracy are somewhat inconsistent with the requirements of a plot quickly scanned by an interested observer for maximum analog information. Instead of using one graph to completely fulfill such criteria as retention of the resolution and accuracy present in the input data; capability of providing easy and rapid visual readout of data; easily understood and readily scanned analog-type presentation; I combine an analog presentation of two-decade resolution with a digital vernier for the third decade of numerical information. This combination of analog-type plot 1, and digital vernier as is described herein can be generated from digital data by the use of any appropriate multistylus recorder and any one of several applicable stylus switching circuits which may be readily constructed by one familiar with the art of switching circuitry.

No specific recorder and no one particular method of switching is required for the production of the described format, nor is any invention claimed in regard to the recorder itself or the associated switching circuitry other than the usage of any appropriate multistylus recorder and appropriate switching circuitry for the process of generating the described format from digital data.

Figure 2:
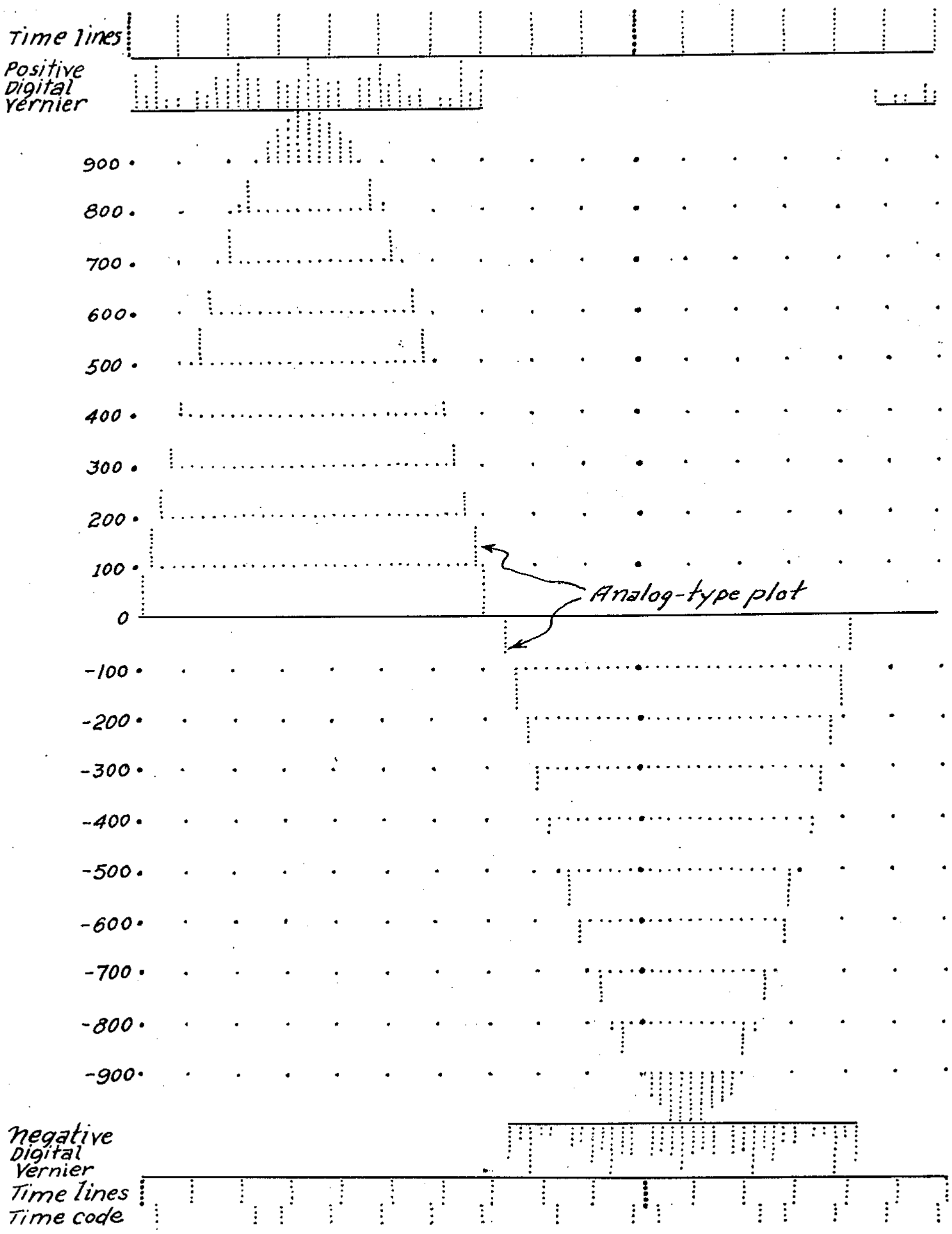
FIGURE 2 shows another application of the invention wherein is shown data including both positive and negative values.

It is obvious to one skilled in the use of multistylus recorders that the recording method may be electrolytic, electrothermal, or may utilize any type of stylus equivalent even including a multiplicity of fixed position, intensity modulated lightbeams, electron or ion sources, magnetic recording devices, or any other method of placing closely adjacent rows of intelligence on a recording medium. Any such recorder may be used to provide the described format if it has an appropriate number of styli for the main or analog-like plot (usually but not necessarily 100 for a unidirectional plot and usually but not necessarily 199 for a plot covering both plus and minus values), and an appropriate number of additional styli, usually but not necessarily colinear with the first groups, for the vernier or verniers. If the data is all positive or negative only one vernier will be needed and this will usually, but not necessarily, be generated by 9 or 10 styli; in the case of both positive and negative data the number of vernier styli used, ordinarily, but not necessarily will be 18 or 20 in order to provide both positive and negative verniers as indicated in FIGURE 2.

Figure 1:
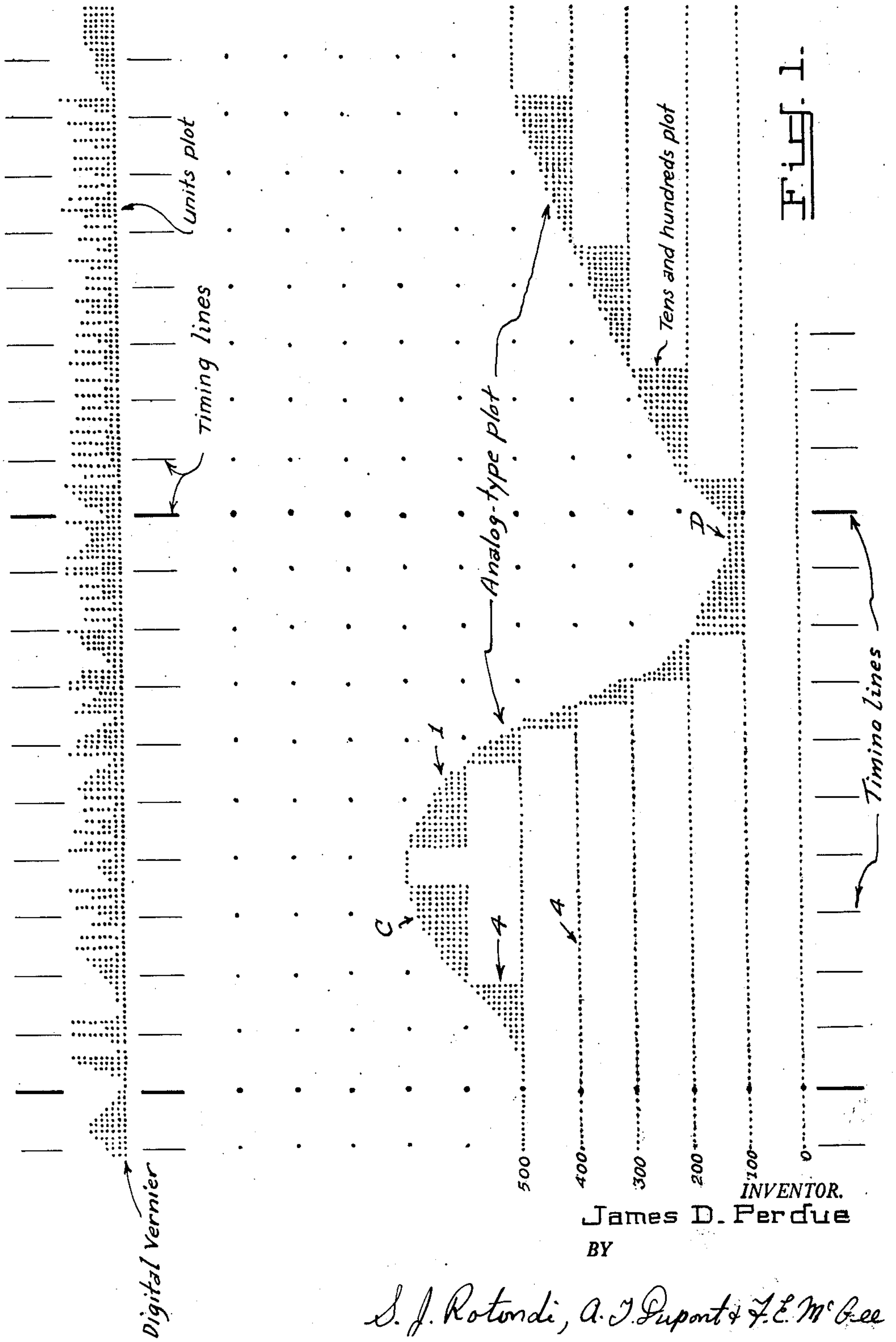
FIGURE 1 shows one method of utilizing the format of the invention.

FIGURE 1 illustrates an elementary application of the described format. The data portion of this typical plot is made with only 110 styli to obtain a resolution of one part in a thousand. One hundred styli are used for the main or analog-like plot and ten styli generate the digital vernier. Present instrumentation practice commonly uses 1000 styli to obtain the same digital resolution. In producing this plot all "hundreds" styli which have a value equal to or less than the hundreds value of the point being plotted are active simultaneously. Also within the applicable hundreds all of the "tens" styli equal to or less than the value of the point being plotted are active. These styli for the tens and hundreds value produce the main analog-type plot 1. In the same manner all "units" styli are activated which have values equal to or less than the instantaneous units value of the incoming data, thus forming the digital vernier.

With reference to FIGURE 1, it can be seen that the main plot is an easily scanned analog-type graph 1 containing self-generated grid lines 4 having a visual resolution of one part in one hundred. The combined presentation of analog-type plot 1 and digital vernier retains in readily usable form the complete digital resolution and accuracy of the original digital input, provided only that the input contains not more than one thousand equal discrete levels.

If, for example, the user of the plotted record desires to evaluate it at, say, point C he may desire either an analog-type or a digital evaluation or both. If the former he quickly notes by a glance at the graph at and near C that the approximate value is about two-thirds of maximum; that the curve has, at the point of interest a decreasing upward slope and is soon to approach a maximum; in other words, he reads the main graph just as he would any ordinary continuous line plot. If, on the other hand, the user has need for the digital value of the function at point C he notes that C is above the 600, but not above the 700, calibration line. He then counts the lines, or dots, from C down to the 600 calibration line noting that there are 8 of them. These two facts from the main plot establish the value of the function at point C as lying on or between 680 and 689. Reference to the vernier shows two dots or lines above the vernier zero reference line and vertically aligned with point C, hence the units value is 2 and the exact value of the function at C is 682.

In the same manner the value of the function at point D is determined from the main graph to be on or between the values 120 and 129; the vernier indicates a units value of 7, hence the value of the variable at D is 127.

A multistylus recorder will make either lines or dots on the recording medium depending upon the interrelationship of stylus energizing frequency, the duration of the energizing pulse, and the speed of recording medium travel under the styli.

Hence, in these discussions the term "line" or "lines" is used to mean either a continuous line, or a dashed line in a succession of regularly spaced dots which lie along a straight line.

It will be noted that four types of grid lines are utilized in making these evaluations. These are: (1) The widely spaced horizontal coordinate lines, having a value of 100 and occurring between the hundreds value of any plotted point and the zero axis. (2) The closely spaced horizontal coordinate line having a value of 10 and occurring between the plotted point on the main graph and the line representing its hundreds value. (3) The closely spaced horizontal coordinate lines having a value of 1 and occurring between the plotted point on the vernier graph and the zero axis of the vernier. (4) The vertical lines formed by selectively positioned periodic light or heavy dots above the main graph and indicating proportionate change of value in the X direction (usually time). It will be noted that these vertical lines may preferably, but not necessarily, be associated with essentially continuous timing lines above and/or below the various portions of the graph. It will also be noted that the use of the time markings as an integral point of the plot itself is a desirable, but not a necessary, part of the described format.

It is apparent that any one or a combination of two or more of many methods may be used for indicating the values of these four types of grid lines. They may for instance be unmarked, they may be hand or stamp annotated after the graph has been prepared, they may be identified in some manner at the time of plotting, or other means may be used. The vertical or timing lines, in particular, are subject to a wide variety of meanings, as appropriate for the data being graphed. A common interpretation would be to use heavy lines and dots for one second intervals, with light lines and dots for one-tenth of a second. The time code, such as is at times associated with instrumentation data, may if desired be indicated with one or more styli, as appropriate.

The switching circuitry required for energizing the appropirate styli in order to produce the desired format does not need to be of any one certain type. It is merely required that it function in such a way as to utilize a digital input signal to produce the described format. This will, in general, mean that the digital input to the plotter itself is in the form sometimes called parallel decimal-decimal. Thus, for three decades of data there will conveniently be three groups of ten wires each. The first wire, in each group in such a case has the value of "zero," the second a value of "one" etc. Thus for a point whose value is 682—such as point C in FIGURE 1, the six hundred is indicated by the energizing of the seventh wire in the hundreds decade, the eighty is indicated by the energizing of the ninth wire in the tens decade, and the 2 by the energizing of the third wire in the units decade of the input to the plotter.

There are many well known methods using mechanical, electromechanical, or electronic switching devices whereby the energizing of the seventh wire in the hundreds group will activate the stylus which makes the mark having a value of 600 and will also activate all hundreds of styli between the selected value and the zero axis. Similarly energizing the seventh wire in the tens decade simultaneously with the six hundred valued stylus energizes the eighty-valued stylus in the 600 to 700 group and also energizes all other styli between this selected stylus and the next lower hundreds stylus in the vernier and simultaneously energizes all other vernier styli between this selected stylus and the zero reference line.

Thus for plotting the point C, FIGURE 1, having a value of 682 together with its associated scaling lines, I simultaneously (or in rapid sequence), energize for the vernier the styli having values of 2, 1, and 0 and for the main graph the styli having values of 680, 670, 660, 650, 640, 630, 620, 610, 600, 500, 400, 300, 200, 100 and 0.

The vertical dotted timing lines on the main body of the graph above, and within, the analog type plot, may be generated by energizing the "900" stylus—and thru it all other "hundreds" styli—at predetermined intervals and at times ordinarily derived from time information commonly associated with the data being plotted. Short and long marking pulses may be used to produce light and heavy timing lines or dots.

The producing of these dotted vertical timing lines by utilization of the same styli that produce the "hundreds" lines on the analog-type graph is considered to be an important, but not an essential, feature of this invention.

It will be noted that the more extensive format of FIGURE 2 differs from that of FIGURE 1 in three characteristics which involve adaptation to special circumstances of the basic ideas as previously described. These three points of difference are: (1) the main or analog-like plot of FIGURE 2 covers the range $\pm 990$ and has scaling lines for all points between the plotted point and the zero axis; (2) two verniers may be used, the use of a negative vernier along the lower edge of the graph making it easier, both physically and psychologically to evaluate the least significant decade of negative data; and (3) the coded time signals associated with the original instrumentation data appear alongside of the data plot.

The method of reading a plot such as shown in FIGURE 2 may be inferred from the previous detailed discussion of FIGURE 1. The data input and switching arrangement for producing this graph will, in general, be similar to that used for FIGURE 1 with the exception that input and switching for "sign" must be provided. This input may be a single wire so utilized that, if the wire is not energized, the data is plotted as positive whereas if the wire is energized the incoming data is caused to activate the corresponding negative printing styli. Alternatively two wires, one for positive and one for negative may be used. There are other self evident possibilities.

The discussion of the described format has, so far, been limited to its application to the situations where the digital data to be plotted is either in the range of 0 to 999 or is within the range of $\pm 999$.

However, it is evident that, should the need arise for the plotting of more precise digital data, the basic idea of the main analog-like plot combined with a digital vernier may be extended to data to four, five, or more significant decades, as required. Within the basic ideas of the described format there are various ways in which this increase in digital resolution may be obtained. Three of the most obvious are: (1) the additional least significant decade(s) may be plotted as (an) additional vernier(s) outside of the vernier representing the third most significant decade, the additional vernier(s) being preferably arranged (if more than one in number) in order of decreasing significance in the direction away from the zero axis; or (2) for that type of data wherein the changes in the one or two most significant decades are relatively slow and it is desirable to have a readily understood picture of the overall change in the third and fourth decades (counting from the left) two parallel plots each having one hundred styli may be used, to give a resolution of one part in ten-thousand; or (3) the three most significant decades may be combined into a analog-like plot of very wide range formed by 1000 styli (or by 1999 for plus and minus data) paralleled by one (or more) one or two decade verniers.

It will be apparent that the embodiments shown are only exemplary and that various modifications can be made in construction and arrangement within the scope as defined in the appended claims.

I claim:

1. A process of displaying digital data in the range of 0–999, comprising the step of combining the two most significant decades of digital information to form an analog-type plot and the step of associating a plot of the least significant decade with the analog-type plot as a digital vernier, plus the step of incorporating automatically generated scaling lines between the instantaneous value of the vernier plot and its zero line between the instantaneous value of the analog-type plot and the next lower hundreds value and at one hundred-valued intervals between the instantaneous hundreds value of the analog-type plot and its zero line.

2. A process of displaying digital data in the range of 0–999, comprising the step of combining the two most significant decades of digital information to form an analog-type plot and the step of associating a plot of the least significant decade with the analog-type plot as a digital vernier, plus the step of incorporating automatically generated scaling lines between the instantaneous value of the vernier plot and its zero line between the instantaneous value of the analog-type plot and the next lower hundreds value and at one hundred-valued intervals between the instantaneous hundreds value of the analog-type plot and its zero line, plus the additional step of incorporating vertical reference.

3. A process of displaying digital data in the range of 0–999, comprising the step of combining the two most significant decades of digital information to form an analog-type plot and the step of associating a plot of the least significant decade with the analog-type plot as a digital vernier, plus the step of incorporating automatically generated scaling lines between the instantaneous value of the vernier plot and its zero line between the instantaneous value of the analog-type plot and the next lower hundreds value and at one hundreds-valued intervals between the instantaneous hundreds value of the analog-type plot and its zero line, plus the additional step of incorporating vertical reference and the step of adding timing lines as an integral part of the analog-type plot.

4. A process of displaying digital data by the step wherein a first group of styli of a multi-stylus recorder plots the digital values of the two most significant decades without regard to the value of the units decade; utilizing for the plotting of each such discrete value styli in addition to the main reference stylus and equal in number to the sum of the tens value plus the hundreds value of the discrete data point; while a second group of styli simultaneously records as a vernier the value of the units digits; utilizing for the plotting of each such discrete value styli in addition to the vernier reference stylus and equal in number to the units value of the discrete data point, plus the step of incorporating vertical reference and the step of adding timing lines as an integral part of the analog-plot.

5. A process of displaying three decades of digital data comprising the step wherein a group of styli of a multistylus recorder produce an analog-type plot from the two most significant decades of digital data while a digital vernier is produced by other styli recording the value of the least significant decade of data, combined with the step of utilizing those vernier-generating styli between the stylus plotting the instantaneous value of the data and the vernier zero line for producing vernier scaling lines, and with the additional step of utilizing those styli which generate the analog-type plot and which lie between the instantaneous value of the point being plotted and that stylus which is plotting the instantaneous value of the most significant decade being recorded on that analog-type for the purpose of automatically producing secondary scaling lines on the said analog-type plot; and finally the steps of utilizing those styli which generate the discrete levels for the most significant decade being recorded on said analog-type plot and which lie between the instantaneous value of the most significant decade and the zero axis of the said analog-type plot for automatically producing primary scaling lines.

6. The process of plotting digital data with a multistylus plotter combining the step of plotting data having a resolution of one part in $n$ with a plotter of $n/9-1$ styli with the step of automatically superimposing scaling lines on the plot by the use of the styli required for the plot itself.

7. The process as set forth in claim 6 plus the step of superposition of timing lines on the plot by use of only the styli required for the plot itself.

8. A process of displaying data covering three decades of digital information comprising, the step of combining the two most significant decades of digital information to form a two decade plot readily capable of either analog or digital interpretation, each discrete value on said plot being represented by a number of lines in addition to a reference line and equal in number to the sum of the value of the most significant decade plus the value of the middle decade and the step of associating a plot of the least significant decade alongside of the two decade plot in a manner that each discrete value is represented on the single decade plot by a number of lines in addition to the reference line, said number of lines being equal in number to the value of the least significant decade.

9. The process described in claim 8 plus the step of incorporating vertical references.

10. The process described in claim 9 plus the additional step of adding timing lines as an integral part of the analog-type plot.

11. A process of displaying data covering three decades of digital information comprising a first step of combining the two most significant decades of digital information to form a two decade plot readily capable of either analog or digital interpretation and a second step of associating a plot of the least significant decade with the two decade plot as a digital vernier.

References Cited in the file of this patent

UNITED STATES PATENTS

| | | |
|---|---|---|
| 2,587,079 | Woods et al. | Feb. 26, 1952 |
| 2,659,650 | MacDonald | Nov. 17, 1953 |
| 2,759,784 | Burke | Aug. 21, 1956 |
| 2,796,314 | Bishop et al. | June 18, 1957 |
| 2,895,783 | Cohen | July 21, 1959 |
| 2,898,175 | Rice et al. | Aug. 4, 1959 |